United States Patent
Schilling et al.

(10) Patent No.: US 8,011,877 B2
(45) Date of Patent: Sep. 6, 2011

(54) FIBER COMPOSITE REINFORCED AIRCRAFT GAS TURBINE ENGINE DRUMS WITH RADIALLY INWARDLY EXTENDING BLADES

(75) Inventors: Jan Christopher Schilling, Middletown, OH (US); Nicholas Joseph Kray, Blue Ash, OH (US)

(73) Assignee: General Electric Company, Schenectady, NY (US)

( * ) Notice: Subject to any disclaimer, the term of this patent is extended or adjusted under 35 U.S.C. 154(b) by 540 days.

(21) Appl. No.: 12/276,522

(22) Filed: Nov. 24, 2008

(65) Prior Publication Data

US 2010/0129227 A1 May 27, 2010

(51) Int. Cl.
*F01D 1/04* (2006.01)
(52) U.S. Cl. ......................................................... 415/91
(58) Field of Classification Search .................... 415/91, 415/65, 66, 68, 199.5; 416/122, 128, 189 A, 416/201 R, 229 A
See application file for complete search history.

(56) References Cited

U.S. PATENT DOCUMENTS

| | | | |
|---|---|---|---|
| 3,519,368 A | 7/1970 | Howald | |
| 3,610,777 A | 10/1971 | Wagle | |
| 3,625,634 A * | 12/1971 | Stedfeld | 416/198 R |
| 3,679,324 A * | 7/1972 | Stargardter | 416/229 R |
| 3,765,796 A | 10/1973 | Stargardter et al. | |
| 3,787,141 A | 1/1974 | Walsh | |
| 3,813,185 A * | 5/1974 | Bouiller et al. | 416/198 R |
| 3,966,523 A * | 6/1976 | Jakobsen et al. | 156/169 |
| 4,232,996 A * | 11/1980 | Stoffer | 416/191 |
| 4,397,609 A * | 8/1983 | Kochendorfer | 416/214 R |
| 4,976,102 A | 12/1990 | Taylor | |
| 5,261,227 A | 11/1993 | Giffin, III | |
| 5,378,110 A * | 1/1995 | Ress, Jr. | 416/244 R |
| 5,400,505 A * | 3/1995 | Wei et al. | 29/889.2 |
| 5,470,524 A * | 11/1995 | Krueger et al. | 419/5 |
| 5,632,600 A | 5/1997 | Hull | |
| 5,660,526 A | 8/1997 | Ress, Jr. | |
| 5,941,688 A * | 8/1999 | Dambrine | 416/194 |
| 6,145,300 A | 11/2000 | Romani | |
| 6,213,720 B1 | 4/2001 | Farmer | |
| 6,247,638 B1 | 6/2001 | Ress, Jr. | |
| 6,619,030 B1 | 9/2003 | Seda et al. | |
| 6,652,222 B1 * | 11/2003 | Wojtyczka et al. | 415/9 |
| 6,666,017 B2 | 12/2003 | Prentice et al. | |
| 6,732,502 B2 | 5/2004 | Seda et al. | |
| 6,739,120 B2 | 5/2004 | Moniz et al. | |
| 6,763,652 B2 | 7/2004 | Baughman et al. | |
| 6,763,654 B2 | 7/2004 | Orlando et al. | |
| 6,883,303 B1 | 4/2005 | Seda | |
| 7,076,942 B2 * | 7/2006 | Schreiber | 60/223 |
| 7,186,073 B2 * | 3/2007 | Orlando et al. | 415/65 |

(Continued)

*Primary Examiner* — Ross Gushi
(74) *Attorney, Agent, or Firm* — William Scott Andes; Steven J. Rosen (57) ABSTRACT

A gas turbine engine assembly having one or more blade rows with blades extending radially inwardly from a rotatable drum, one or more composite fiber material rings disposed circumferentially around the rotatable drum, and the composite fiber material rings including circumferentially extending high strength fibers or filaments. The rings may be axially aligned with the blade rows. Ring widths of the rings may be less wide than blade widths at blade bases of the blades at a radially inner surface of the drum. The rings may be made of a material including a plurality of circumferentially extending reinforcing structural fibers or filaments disposed in an integral matrix. The rotatable drum, rings, and blades extending radially inwardly from the drum may be incorporated in a gas turbine engine booster having one or more rotatable booster stages or in a counter rotatable low pressure turbine.

36 Claims, 5 Drawing Sheets

U.S. PATENT DOCUMENTS

| | | | |
|---|---|---|---|
| 7,195,446 B2 * | 3/2007 | Seda et al. | 415/65 |
| 7,246,990 B2 * | 7/2007 | Xie et al. | 415/9 |
| 7,296,398 B2 * | 11/2007 | Moniz et al. | 60/268 |
| 7,334,999 B2 * | 2/2008 | Aumont et al. | 416/248 |
| 7,390,161 B2 * | 6/2008 | Xie et al. | 415/9 |
| 7,393,182 B2 * | 7/2008 | Matheny | 416/181 |
| 7,490,461 B2 * | 2/2009 | Moniz et al. | 60/268 |
| 7,811,062 B1 * | 10/2010 | Twigg | 416/218 |
| 7,832,193 B2 | 11/2010 | Orlando et al. | 60/268 |
| 7,918,644 B2 * | 4/2011 | Schreiber | 415/199.5 |
| 7,926,259 B2 * | 4/2011 | Orlando et al. | 60/204 |
| 7,966,806 B2 * | 6/2011 | Henry et al. | 60/226.1 |
| 2003/0163983 A1 | 9/2003 | Seda et al. | |
| 2003/0200741 A1 | 10/2003 | Moniz et al. | |
| 2004/0055276 A1 | 3/2004 | John Lewis et al. | |
| 2004/0086384 A1 * | 5/2004 | Mundra et al. | 415/214.1 |
| 2004/0211167 A1 * | 10/2004 | Schreiber | 60/226.1 |
| 2005/0084379 A1 * | 4/2005 | Schreiber | 416/230 |
| 2006/0201135 A1 * | 9/2006 | Xie et al. | 60/226.1 |
| 2007/0081887 A1 * | 4/2007 | Xie et al. | 415/9 |
| 2007/0086889 A1 * | 4/2007 | Matheny | 415/189 |
| 2007/0231144 A1 * | 10/2007 | Schreiber | 416/193 A |
| 2008/0120839 A1 * | 5/2008 | Schilling | 29/888.02 |
| 2009/0087309 A1 * | 4/2009 | Schreiber | 415/200 |
| 2010/0126141 A1 * | 5/2010 | Schilling | 60/268 |

* cited by examiner

FIBER COMPOSITE REINFORCED AIRCRAFT GAS TURBINE ENGINE DRUMS WITH RADIALLY INWARDLY EXTENDING BLADES

BACKGROUND OF THE INVENTION

1. Field of the Invention

The invention relates to gas turbine engines and, more particularly, to rotatable drums having radially inwardly extending blades for such engines.

2. Description of Related Art

A gas turbine engine of the turbofan type generally includes a forward fan and booster compressor, a middle core engine, and an aft low pressure power turbine. The core engine includes a high pressure compressor, a combustor, and a high pressure turbine in a serial flow relationship. The high pressure compressor and high pressure turbine of the core engine are interconnected by a high pressure shaft. The high pressure compressor, turbine, and shaft essentially form the high pressure rotor. The high pressure compressor is rotatably driven to compress air entering the core engine to a relatively high pressure. This high pressure air is then mixed with fuel in the combustor and ignited to form a high energy gas stream. The gas stream flows aft and passes through the high pressure turbine, rotatably driving it and the high pressure shaft which, in turn, rotatably drives the compressor.

The gas stream leaving the high pressure turbine is expanded through a second or low pressure turbine. The low pressure turbine rotatably drives the fan and booster compressor via a low pressure shaft, all of which form the low pressure rotor. The low pressure shaft extends through the high pressure rotor. Some fan jet engines have been designed with counter-rotating turbines that power counter-rotating fans and boosters or low pressure compressors. U.S. Pat. Nos. 4,790,133, 4,860,537, 5,307,622 and 6,732,502 disclose counter-rotating low pressure turbines (LPT) that power counter-rotating fans and booster or low pressure compressors. Most of the thrust produced is generated by the fan. There are also various designs for counter-rotating fan engines that use gearboxes to effect counter-rotation of the fans and boosters.

Counter-rotating boosters typically have interdigitated counter-rotating blades with a first set of booster blades counter-rotating with respect to a second set of booster blades wherein one of the sets of blades are mounted to and extend radially inwardly from a rotatable outer shell, drum or duct. A gas turbine engine booster having one or more rotatable booster stages with booster blades extending radially inwardly from a rotatable drum and one or more non-rotatable vane stages having booster vanes extending radially outwardly from a non-rotatable annular structure has also been developed as disclosed in U.S. patent application Ser. No. 12/275,813, currently designated as docket number 228194, entitled "AIRCRAFT GAS TURBINE ENGINE BOOSTER HAVING ROTATABLE RADIALLY INWARDLY EXTENDING BOOSTER BLADES AND NON-ROTATABLE RADIALLY OUTWARDLY EXTENDING BOOSTER VANES", and assigned to the present Assignee, General Electric Company. Counter-rotating low pressure turbines have been developed that include a first annular low pressure drum with first turbine blade rows extending radially inwardly therefrom and axially spaced from each other. The first low pressure turbine blade rows are interdigitated with second low pressure turbine blade rows extending radially outwardly from a second annular low pressure drum.

The drums with radially inwardly extending blade rows have structural requirements that are hampered by the weight of the drum. The added weight of the drum structure necessary to mount the blades also tends to increase specific fuel consumption of the engine. The centrifugal force due to rotation of the blades must be countered by strengthening the drum by thickening and hence adding more weight to the drum. Thus, an alternative more robust drum design or configuration is desirable in order to minimize the weight of the drum.

SUMMARY OF THE INVENTION

A gas turbine engine assembly includes one or more blade rows having blades extending radially inwardly from a rotatable drum. One or more composite fiber material rings are disposed circumferentially around a radially outer surface of the rotatable drum and located radially outwardly of the blades of the one or more blade rows. The composite fiber material rings include high strength fibers or filaments extending circumferentially around the drum. The filaments are wound in tension around the drum and may be dry or wet. Wet filaments are filaments covered with or otherwise containing a matrix material. After being wound the wet fibers are cured forming the hard composite fiber material rings.

The one or more composite fiber material rings may be generally axially aligned with the one or more blade rows respectively. The rings may have ring widths that are less wide than blade widths at blade bases of the blades at a radially inner surface of the drum. The rings may be made of a material including a plurality of circumferentially extending reinforcing structural fibers or filaments disposed in an integral matrix.

A gas turbine engine booster includes one or more rotatable booster stages having booster blades extending radially inwardly from a rotatable drum, one or more composite fiber material rings disposed circumferentially around a radially outer surface of the rotatable drum and located radially outwardly of the blades of the one or more blade rows. The composite fiber material rings include high strength fibers or filaments extending circumferentially around the drum.

The gas turbine engine booster may further include one or more non-rotatable vane stages having booster vanes extending radially outwardly from a non-rotatable annular structure, one or more booster blade rows of the booster blades of the one or more rotatable booster stages respectively, and one or more vane rows of the booster vanes of the one or more non-rotatable vane stages respectively. The booster blade rows are interdigitated with the vane rows.

The gas turbine engine booster may be a counter rotatable booster with counter rotatable booster blades and the drum being a rotatable booster first drum. A first set of counter rotatable booster blades extend radially inwardly from the rotatable booster first drum, a second set of the counter rotatable booster blades extend radially outwardly from a rotatable booster second drum, and one or more of the counter rotatable first blade rows are interdigitated with one or more of the counter rotatable second blade rows.

A counter rotatable low pressure turbine includes a plurality of axially spaced apart first low pressure turbine blade rows having low pressure turbine blades extending radially inwardly from a rotatable outer drum, one or more composite fiber material rings disposed circumferentially around a radially outer surface of the rotatable outer drum, the one or more composite fiber material rings disposed radially outwardly of the low pressure turbine blades of the first low pressure turbine blade rows, and the composite fiber material rings including high strength fibers or filaments extending circumferentially around the outer drum. The counter rotatable low pressure turbine may further include one or more second low pressure turbine blade rows having the low pressure turbine blades extending radially outwardly from an inner drum and the second low pressure turbine blade rows being interdigitated with the one or more first low pressure turbine blade rows.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
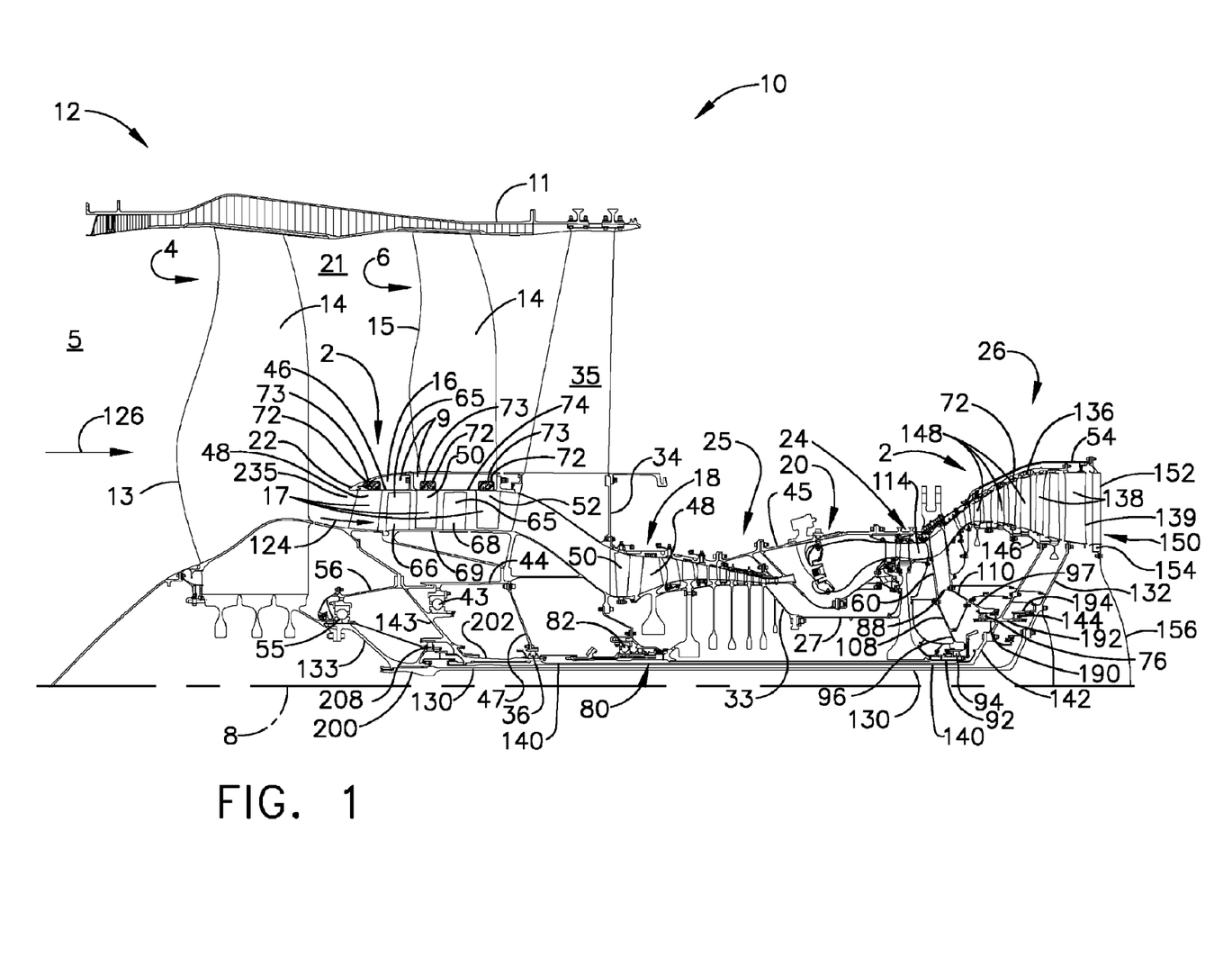
FIG. 1 is a longitudinal sectional view illustration of an exemplary embodiment of an aircraft turbofan gas turbine engine with rotatable booster blades extending radially inwardly from rotatable drums in a booster and a counter rotatable turbine of the engine and composite fiber material rings around radially outer surfaces of the drums.
Figure 2:
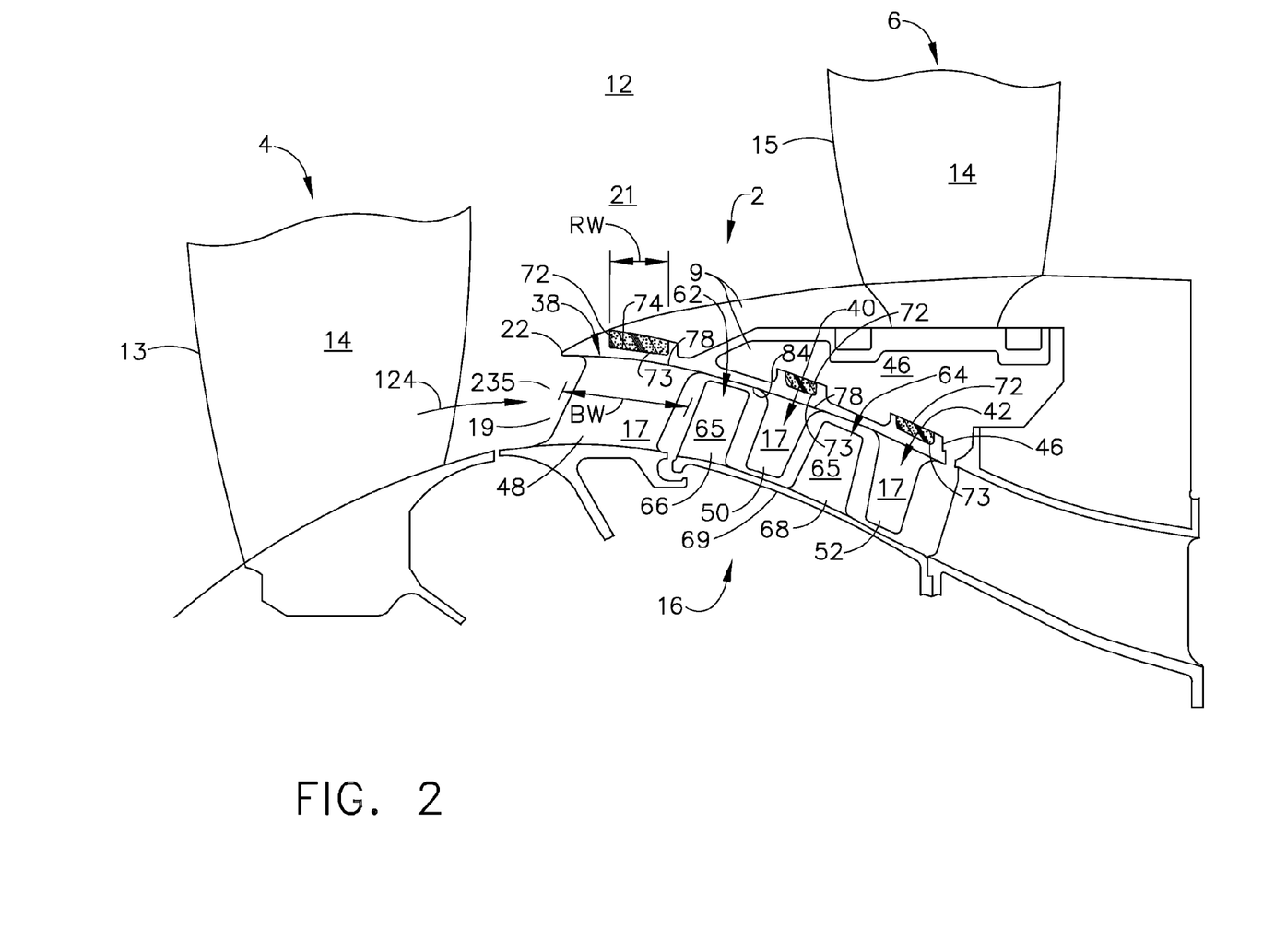
FIG. 2 is an enlarged longitudinal sectional view illustration of the booster drum and composite fiber material rings illustrated in FIG. 1.

Illustrated in FIGS. 1 and 2 is an exemplary turbofan gas turbine engine 10 circumscribed about an engine centerline 8 and having a fan section 12 which receives inlet airflow of ambient air 5. The fan section 12 has counter rotatable first and second fan stages 4, 6 including first and second fan blade rows 13, 15, respectively.

A booster 16, representative of a gas turbine engine rotor assembly, is axially located substantially between the first and second fan stages 4, 6. Locating the booster 16 substantially between the first and second fan stages 4, 6 helps to reduce noise due to aerodynamic interaction between the two fan stages.

The booster 16 has rotatable first, second, and third booster stages 38, 40, 42 with first, second, and third booster blade rows 48, 50, 52, respectively. Booster blades 17 of the first, second, and third booster blade rows 48, 50, 52 extend radially inwardly from a rotatable drum 46 connected to the second fan stage 6. The booster 16 has non-rotatable first and second vane stages 62, 64 with first and second vane rows 66, 68, respectively.

Composite fiber material rings 72 are disposed around a radially outer surface 74 of the rotatable drum 46 and radially outwardly of the booster blades 17 of the first, second, and third booster blade rows 48, 50, 52. The composite fiber material rings 72 are generally axially aligned with the first, second, and third booster blade rows 48, 50, 52 and have ring widths RW that are less wide than blade widths BW at blade bases 78 of the booster blades 17 at a radially inner surface 84 of the drum 46. The ring widths RW do not have to be less wide than the blade widths BW at the radially inner surface 84 of the drum 46.

The composite fiber material rings 72 help minimize the mass of the drum 46 and are redundant structures because even if some fibers 73 or filaments of the rings 72 fail the rest will still provide more than sufficient strength for the rings to provide their structural function to contain the rotating blades 17 in their place on the drums. The composite fiber material rings 72 include high strength fibers 73 or filaments extending circumferentially around the drum 46. The strength of these fibers 73 or filaments may be equivalent to the metallic material they replace on the drum but have about ⅓ the weight. The fibers 73 or filaments carry hoop strain in the circumferential direction which results in redundancy. If a fiber or filament breaks, the crack will not propagate. Rotating parts are life limited for commercial aviation and the composite fiber material with will be no different. When the life limit is reached the used composite fiber ring can be removed and a new ring wound or otherwise disposed around the drum.

There are many fibers or filaments that may be used and well known in the art. Some exemplary composite fiber materials are disclosed in U.S. Pat. Nos. 3,554,667, 3,625,634, 3,765,796, 5,632,600, and 6,213,720. The composite fiber material rings 72 may be a light weight, high strength, composite material including a plurality of circumferentially extending reinforcing structural fibers 73 or filaments disposed in a suitable integral matrix. The composite fiber material rings 72 may include one or more circumferentially wound filaments embedded in a matrix material and the filaments and matrix may be made from carbon. Examples of other possible filament and matrix materials are sapphire-nickel, boron-titanium, and graphite-graphite. The filaments are wound in tension around the drum and may be dry or wet. Wet filaments are filaments covered with or otherwise containing a matrix material. After being wound the wet fibers are cured forming the hard composite fiber material rings 72.

Booster vanes 65 of the first and second vane stages 62, 64 extend radially outwardly from a non-rotatable shell 69 or other annular structure fixedly connected to a forward or fan frame 34. The first, second, and third booster blade rows 48, 50, 52 are interdigitated with the first and second vane rows 66, 68. Thus, when the engine accelerates the booster blades 17 are urged radially outwardly while the non-rotatable shell 69 remains radially in place, thus, reducing or eliminating rubs of the blades against the shells. This, in turn, allows a robust and lightweight design of the booster 16. Fan blades 14 of the second fan blade row 15 of the second fan stage 6 are mounted radially outwardly of the booster 16 and is connected to the rotatable drum 46.

Referring to FIG. 1, following the fan section 12 is a high pressure compressor (HPC) 18, a combustor 20 which mixes fuel with the air 5 pressurized by the HPC 18 for generating combustion gases which flow downstream through a high pressure turbine (HPT) 24, and a counter rotatable low pressure turbine (LPT) 26 from which the combustion gases are discharged from the engine 10. A high pressure shaft 27 joins the HPT 24 to the HPC 18 to substantially form a first or high pressure rotor 33.

The high pressure compressor 18, combustor 20, and high pressure turbine 24 collectively are referred to as a core engine 25 which includes, for the purposes of this patent, the high pressure shaft 27.

A bypass duct 21 radially, bounded by a fan casing 11 and a rotatable annular radially inner bypass duct wall 9, surrounds the booster 16 and a core engine inlet duct 19 to the high pressure compressor 18 of the core engine 25. The bypass duct 21 is radially bounded by a fan casing 11 and an annular radially inner bypass duct wall 9. The radially inner bypass duct wall 9 includes a rotatable wall section 22, including the rotatable drum 46, fixedly mounted to the second fan blade row 15. The second fan blade row 15 is radially disposed within the bypass duct 21 and the fan blades 14 extend radially outwardly from the rotatable wall section 22 and are located radially outwardly of the rotatable drum 46.

The inlet duct 19 has an entrance 235 located axially aft and downstream of the first fan stage 4 and the first fan blade row 13 which permits debris from the runway (FOD), dirt, particles, and ice to be centrifuged away out of a core portion 124 of fan air flow 126 exiting the first fan stage 4 and entering the inlet duct 19 and into the high pressure compressor 18 and the core engine 25. The booster blades 17 and vanes 65 are disposed across the inlet duct 19.

Figure 3:
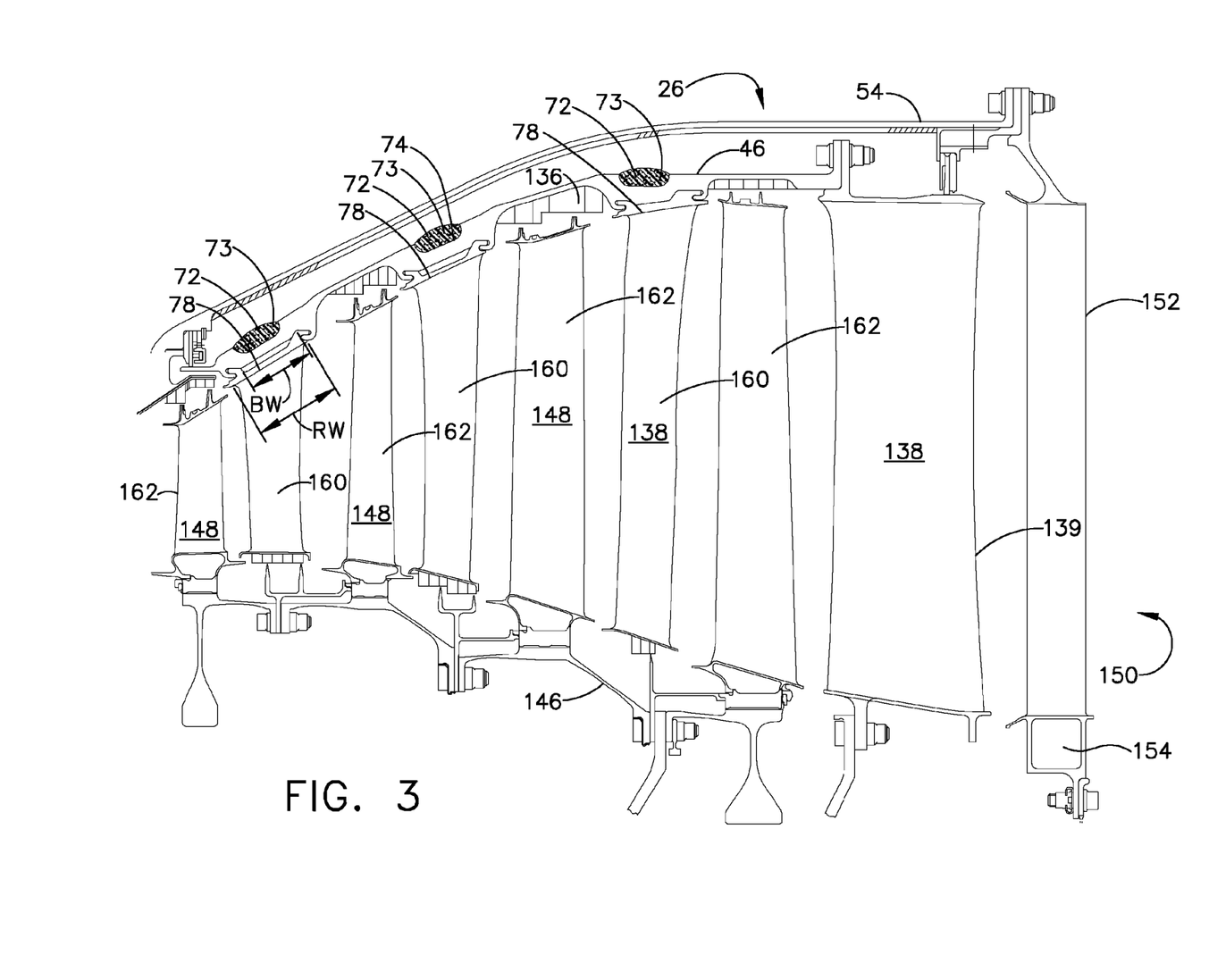
FIG. 3 is an enlarged longitudinal sectional view illustration of a turbine drum and composite fiber material rings illustrated in FIG. 1.

Referring to FIGS. 1 and 3, the counter rotatable low pressure turbine 26, another exemplary representative of a gas turbine engine rotor assembly, includes an annular outer drum 136 rotatably mounted to a low pressure inner shaft 130 by an aft low pressure inner conical shaft extension 132. The outer drum 136 includes a plurality of axially spaced apart first low pressure turbine blade rows 138 having low pressure first turbine blades 160 extending radially inwardly from the outer drum 136.

The outer drum 136 is cantilevered off of a final stage 139 of the first low pressure turbine blade rows 138 which is bolted to the aft low pressure inner conical shaft extension 132.

Referring to FIG. 3, composite fiber material rings 72 are disposed around a radially outer surface 74 of the rotatable outer drum 136 and radially outwardly of the low pressure first turbine blades 160 of the axially spaced apart first low pressure first turbine blade rows 138. The composite fiber material rings 72 are generally axially aligned with the first low pressure turbine blade rows 138 and have ring widths RW that are less wide than blade widths BW at blade bases 78 of the low pressure first turbine blades 160 at a radially inner surface 84 of the outer drum 136. The ring widths RW do not have to be less wide than the blade widths BW at the radially inner surface 84 of the outer drum 136.

Referring to FIG. 1, the counter rotatable low pressure turbine 26 also includes an annular low pressure inner drum 146 rotatably mounted to a low pressure outer shaft 140 by an aft low pressure outer conical shaft extension 142. The inner drum 146 includes a plurality of second low pressure turbine blade rows 148 having low pressure second turbine blades 162 extending radially outwardly from the inner drum 146 and axially spaced from each other. The first low pressure turbine blade rows 138 are interdigitated with the second low pressure turbine blade rows 148.

The low pressure outer shaft 140 drivingly connects the inner drum 146 to the booster 16 to which the second fan blade row 15 is connected. The booster 16 and the second fan blade row 15 are connected to the low pressure outer shaft 140 by a forward conical outer shaft extension 143. The low pressure outer shaft 140, the inner drum 146, the second fan blade row 15, and the booster 16 are major components of a low pressure outer rotor 202. The low pressure inner shaft 130 drivingly connects the outer drum 136 to the first fan blade row 13. The first fan blade row 13 is connected to the low pressure inner shaft 130 by a forward conical inner shaft extension 133. The low pressure inner shaft 130, the outer drum 136, and the first fan blade row 13 are major components of a low pressure inner rotor 200. The low pressure inner and outer shafts 130, 140, respectively, are at least, in part, rotatably disposed co-axially with and radially inwardly of the high pressure rotor 33.

The low pressure outer rotor 202, by way of the forward conical outer shaft extension 143, is rotatably supported axially and radially from the fan frame 34 by an aft thrust bearing 43 mounted in a first bearing support structure 44 and a second bearing 36, a roller bearing, mounted in a second bearing support structure 47. The low pressure inner rotor 200, by way of the forward conical inner shaft extension 133, is rotatably supported axially and radially from the fan frame 34 by a forward differential thrust bearing 55 which is mounted between a forwardly extending extension 56 of the forward conical outer shaft extension 143 and the forward conical inner shaft extension 133. The low pressure inner rotor 200 is further rotatably supported radially from the fan frame 34 by a forward differential bearing 208, a roller bearing, between the low pressure inner shaft 130 and the low pressure outer shaft 140. The first and second bearing support structures 44, 47 are fixedly attached to the fan frame 34. The fan casing 11 is fixedly connected to the fan frame 34 by fan frame struts 35.

The low pressure outer rotor 202, by way of the aft low pressure outer conical shaft extension 142 connected to the low pressure outer shaft 140, is rotatably supported radially by a third bearing 76 within an inter-turbine frame 60. The third bearing 76 is disposed between an aft bearing support structure 97 attached to an aft portion 110 of the inter-turbine frame 60 and a forward inner extension 190 of the aft low pressure outer conical shaft extension 142. The low pressure outer rotor 202 is most aftwardly rotatably supported by the third bearing 76. An inter-turbine frame 60 axially located between the HPT 24 and the LPT 26 substantially supports the entire low pressure turbine 26.

The low pressure inner rotor 200, by way of the aft low pressure inner conical shaft extension 132 connected to the low pressure inner shaft 130, is rotatably supported radially by the aft low pressure outer conical shaft extension 142 of the low pressure outer rotor 202. A differential bearing 144 (also referred to as an inter-shaft bearing) is disposed between an aft inner extension 192 of the aft low pressure outer conical shaft extension 142 and an outer extension 194 of the aft low pressure inner conical shaft extension 132. This allows the low pressure inner and outer rotors 200, 202 to counter rotate.

A forward high pressure end 70 of the high pressure compressor 18 of the high pressure rotor 33 is radially rotatably supported by a bearing assembly 80 mounted in a bearing assembly support structure 82 attached to the fan frame 34. An aft end 92 of the high pressure rotor 33 is aftwardly radially rotatably supported by a fifth bearing 94 mounted in a forward bearing support structure 96 attached to a forward portion 108 of the inter-turbine frame 60. The forward and aft bearing support structures 96, 97 are fixedly joined or attached to the forward and aft portions 108, 110, respectively, of the inter-turbine frame 60 and are spaced axially apart. The forward and aft portions 108, 110, respectively, of the inter-turbine frame 60 are separated by a structural ring 88.

Located aft of the LPT 26 is an outlet guide vane assembly 150 which supports a stationary row of outlet guide vanes 152 that extend radially inwardly between a low pressure turbine casing 54 and an annular box structure 154. The outlet guide vane assembly 150 deswirls gas flow exiting the LPT 26. The low pressure turbine casing 54 connected is bolted to the engine casing 45 at the end of the inter-turbine transition duct 114 between the HPT 24 and the LPT 26. A dome-shaped cover plate 156 is bolted to the annular box structure 154.

Figure 4:
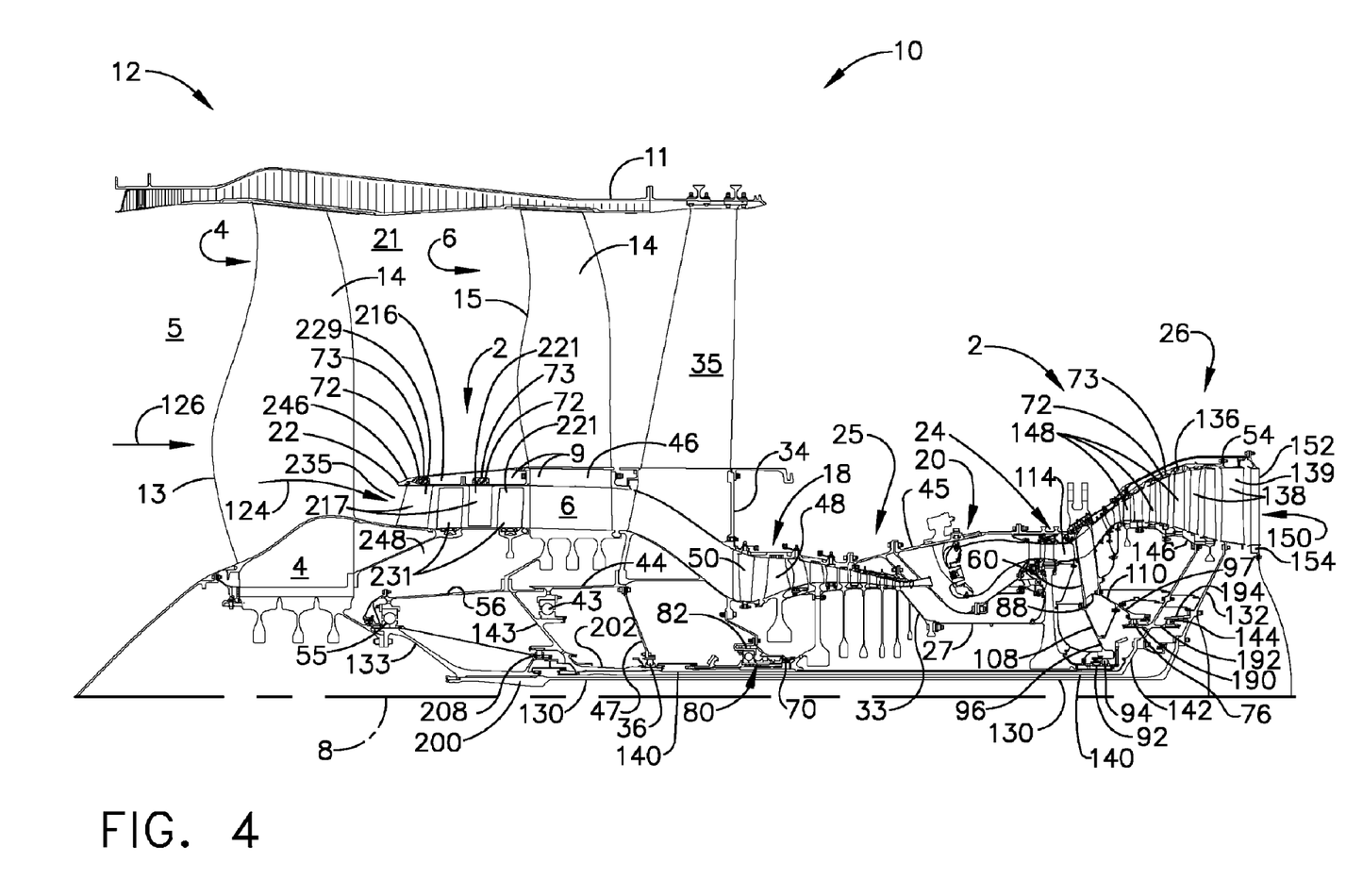
FIG. 4 is a longitudinal sectional view illustration of an exemplary embodiment of an aircraft turbofan gas turbine engine with a counter rotatable booster and booster blades extending radially inwardly from a booster drum and composite fiber material rings around a radially outer surface of the booster drum.
Figure 5:
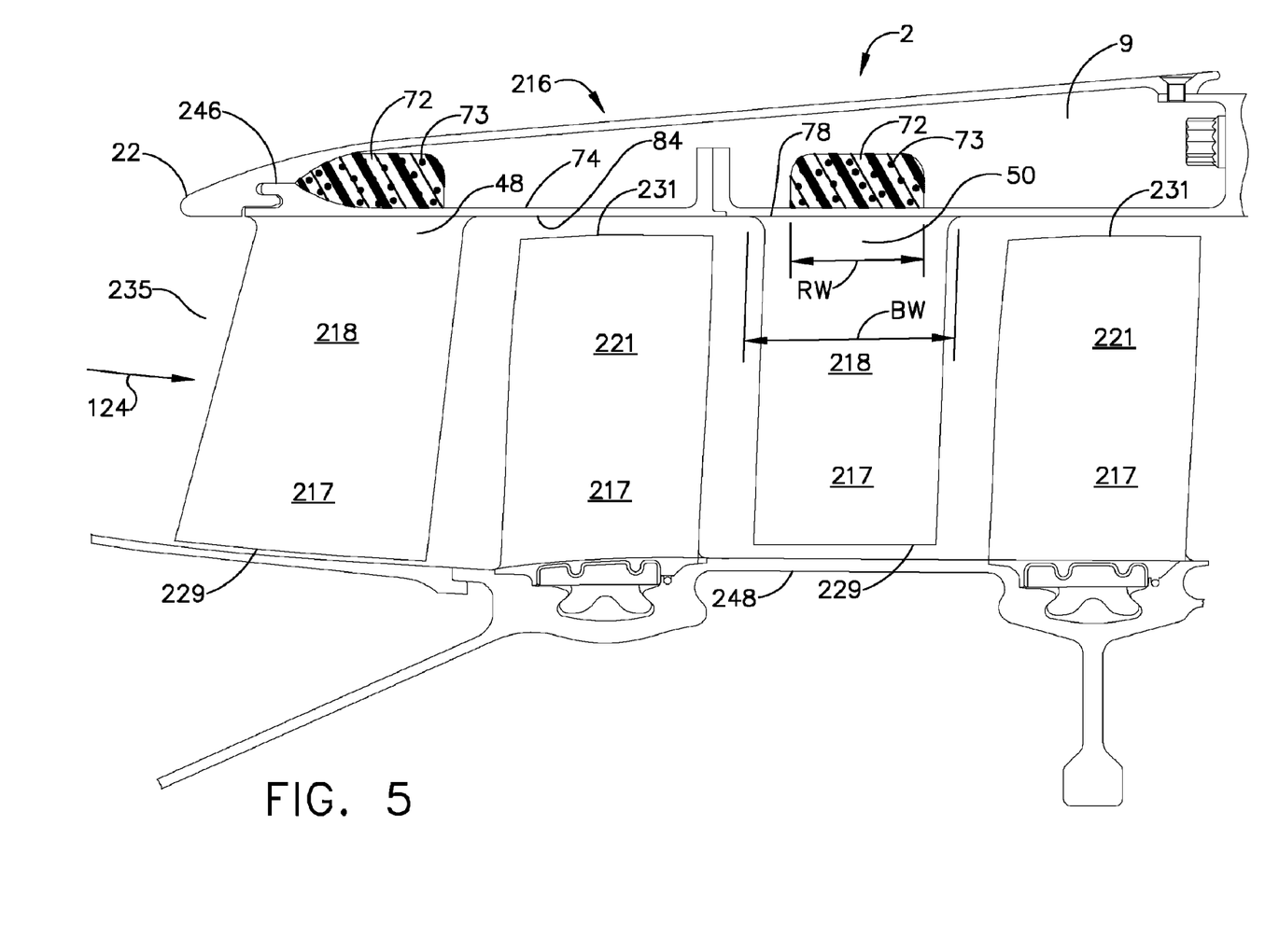
FIG. 5 is an enlarged longitudinal sectional view illustration of the booster drum and composite fiber material rings illustrated in FIG. 4.

Schematically illustrated in FIGS. 4 and 5 is an exemplary embodiment of an aircraft turbofan gas turbine engine 10 with a counter rotatable booster 216 with counter rotatable first and second sets 218, 221 of counter rotatable booster blades 217 in counter-rotatable first and second blade rows 229, 231. The first set 218 of counter rotatable booster blades 217 extend radially inwardly from a rotatable booster first drum 246 and the second set 221 of counter rotatable booster blades 217 extend radially outwardly from a rotatable booster second drum 248. One or more of the counter rotatable first blade rows 229 are interdigitated with one or more of the counter rotatable second blade rows 231. The rotatable booster first and second drums 246, 248 are connected to and rotatable with the counter rotatable first and second fan stages 4, 6 respectively as illustrated in FIG. 4.

Referring more particularly to FIG. 5, composite fiber material rings 72 are disposed around a radially outer surface 74 of the first drum 246 and radially outwardly of the booster blades 217 extending radially inwardly from the rotatable booster first drum 246. The composite fiber material rings 72 are generally axially aligned with the booster blades 217 extending radially inwardly from the rotatable booster first drum 246. The composite fiber material rings 72 have ring widths RW that are less wide than blade widths BW at blade bases 78 of the booster blades 17 at a radially inner surface 84 of the first drum 246. The ring widths RW do not have to be less wide than the blade widths BW at the radially inner surface 84 of the first drum 246.

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and it is, therefore, desired to be secured in the appended claims all such modifications as fall within the true spirit and scope of the invention.

What is claimed is:

1. A gas turbine engine assembly comprising:
   one or more blade rows having blades extending radially inwardly from a rotatable drum,
   one or more composite fiber material rings disposed circumferentially around a radially outer surface of the rotatable drum and located radially outwardly of the blades of the one or more blade rows, and
   the composite fiber material rings including high strength fibers or filaments extending circumferentially around the drum.

2. An assembly as claimed in claim 1, further comprising the one or more composite fiber material rings being generally axially aligned with the one or more blade rows respectively.

3. An assembly as claimed in claim 2, further comprising the composite fiber material rings having ring widths less wide than blade widths at blade bases of the blades at a radially inner surface of the drum.

4. An assembly as claimed in claim 1, further comprising the one or more composite fiber material rings made of a material including a plurality of circumferentially extending reinforcing structural fibers or filaments disposed in an integral matrix.

5. An assembly as claimed in claim 4, further comprising the one or more composite fiber material rings being generally axially aligned with the one or more blade rows respectively.

6. An assembly as claimed in claim 5, further comprising the composite fiber material rings having ring widths less wide than blade widths at blade bases of the blades at a radially inner surface of the drum.

7. A gas turbine engine booster comprising:
   one or more rotatable booster stages having booster blades extending radially inwardly from a rotatable drum,
   one or more composite fiber material rings disposed circumferentially around a radially outer surface of the rotatable drum and located radially outwardly of the blades of the one or more blade rows, and
   the composite fiber material rings including high strength fibers or filaments extending circumferentially around the drum.

8. A gas turbine engine booster as claimed in claim 7, further comprising the one or more composite fiber material rings being generally axially aligned with the one or more blade rows respectively.

9. A gas turbine engine booster as claimed in claim 8, further comprising the composite fiber material rings having ring widths less wide than blade widths at blade bases of the blades at a radially inner surface of the drum.

10. A gas turbine engine booster as claimed in claim 7, further comprising the one or more composite fiber material rings made of a material including a plurality of circumferentially extending reinforcing structural fibers or filaments disposed in an integral matrix.

11. A gas turbine engine booster as claimed in claim 10, further comprising the one or more composite fiber material rings being generally axially aligned with the one or more blade rows respectively.

12. A gas turbine engine booster as claimed in claim 11, further comprising the composite fiber material rings having ring widths less wide than blade widths at blade bases of the blades at a radially inner surface of the drum.

13. A gas turbine engine booster as claimed in claim 7, further comprising:
   one or more non-rotatable vane stages having booster vanes extending radially outwardly from a non-rotatable annular structure,
   one or more booster blade rows of the booster blades of the one or more rotatable booster stages respectively,
   one or more vane rows of the booster vanes of the one or more non-rotatable vane stages respectively, and
   the booster blade rows being interdigitated with the vane rows.

14. A gas turbine engine booster as claimed in claim 13, further comprising the one or more composite fiber material rings being generally axially aligned with the one or more blade rows respectively.

15. A gas turbine engine booster as claimed in claim 14, further comprising the composite fiber material rings having ring widths less wide than blade widths at blade bases of the blades at a radially inner surface of the drum.

16. A gas turbine engine booster as claimed in claim 13, further comprising the one or more composite fiber material rings made of a material including a plurality of circumferentially extending reinforcing structural fibers or filaments disposed in an integral matrix.

17. A gas turbine engine booster as claimed in claim 16, further comprising the one or more composite fiber material rings being generally axially aligned with the one or more blade rows respectively.

18. A gas turbine engine booster as claimed in claim 17, further comprising the composite fiber material rings having ring widths less wide than blade widths at blade bases of the blades at a radially inner surface of the drum.

19. A gas turbine engine booster as claimed in claim 7, further comprising:
the gas turbine engine booster being a counter rotatable booster and the booster blades being counter rotatable booster blades and the drum being a rotatable booster first drum,
a first set of counter rotatable booster blades extending radially inwardly from the rotatable booster first drum,
a second set of the counter rotatable booster blades extending radially outwardly from a rotatable booster second drum, and
one or more of the counter rotatable first blade rows being interdigitated with one or more of the counter rotatable second blade rows.

20. A gas turbine engine booster as claimed in claim 19, further comprising the one or more composite fiber material rings being generally axially aligned with the one or more blade rows respectively.

21. A gas turbine engine booster as claimed in claim 20, further comprising the composite fiber material rings having ring widths less wide than blade widths at blade bases of the blades at a radially inner surface of the drum.

22. A gas turbine engine booster as claimed in claim 19, further comprising the one or more composite fiber material rings made of a material including a plurality of circumferentially extending reinforcing structural fibers or filaments disposed in an integral matrix.

23. A gas turbine engine booster as claimed in claim 22, further comprising the one or more composite fiber material rings being generally axially aligned with the one or more blade rows respectively.

24. A gas turbine engine booster as claimed in claim 23, further comprising the composite fiber material rings having ring widths less wide than blade widths at blade bases of the blades at a radially inner surface of the drum.

25. A counter rotatable low pressure turbine comprising:
a plurality of axially spaced apart first low pressure turbine blade rows having low pressure first turbine blades extending radially inwardly from a rotatable outer drum,
one or more composite fiber material rings disposed circumferentially around a radially outer surface of the rotatable outer drum,
the one or more composite fiber material rings being disposed radially outwardly of the low pressure first turbine blades of the first low pressure turbine blade rows, and
the composite fiber material rings including high strength fibers or filaments extending circumferentially around the outer drum.

26. A counter rotatable low pressure turbine as claimed in claim 25, further comprising the one or more composite fiber material rings being generally axially aligned with the one or more first low pressure turbine blade rows respectively.

27. A counter rotatable low pressure turbine as claimed in claim 26, further comprising the composite fiber material rings having ring widths less wide than blade widths at blade bases of the low pressure first turbine blades at a radially inner surface of the outer drum.

28. A counter rotatable low pressure turbine as claimed in claim 25, further comprising the one or more composite fiber material rings made of a material including a plurality of circumferentially extending reinforcing structural fibers or filaments disposed in an integral matrix.

29. A counter rotatable low pressure turbine as claimed in claim 28, further comprising the one or more composite fiber material rings being generally axially aligned with the one or more first low pressure turbine blade rows respectively.

30. A counter rotatable low pressure turbine as claimed in claim 29, further comprising the composite fiber material rings having ring widths less wide than blade widths at blade bases of the blades at a radially inner surface of the outer drum.

31. A counter rotatable low pressure turbine as claimed in claim 25, further comprising one or more second low pressure turbine blade rows having low pressure second turbine blades extending radially outwardly from an inner drum and the second low pressure turbine blade rows being interdigitated with the one or more first low pressure turbine blade rows.

32. A counter rotatable low pressure turbine as claimed in claim 31, further comprising the one or more composite fiber material rings being generally axially aligned with the one or more first low pressure turbine blade rows respectively.

33. A counter rotatable low pressure turbine as claimed in claim 32, further comprising the composite fiber material rings having ring widths less wide than blade widths at blade bases of the low pressure turbine blades at a radially inner surface of the outer drum.

34. A counter rotatable low pressure turbine as claimed in claim 31, further comprising the one or more composite fiber material rings made of a material including a plurality of circumferentially extending reinforcing structural fibers or filaments disposed in an integral matrix.

35. A counter rotatable low pressure turbine as claimed in claim 34, further comprising the one or more composite fiber material rings being generally axially aligned with the one or more first low pressure turbine blade rows respectively.

36. A counter rotatable low pressure turbine as claimed in claim 35, further comprising the composite fiber material rings having ring widths less wide than blade widths at blade bases of the blades at a radially inner surface of the outer drum.

* * * * *